US012045787B2

(12) United States Patent
Goetz et al.

(10) Patent No.: US 12,045,787 B2
(45) Date of Patent: *Jul. 23, 2024

(54) CASH DELIVERY APPLICATION

(71) Applicant: Wells Fargo Bank, N.A., San Francisco, CA (US)

(72) Inventors: Darren M. Goetz, Salinas, CA (US); Ashish B. Kurani, Hillsborough, CA (US); JoAnn Mar, San Francisco, CA (US); Dennis E. Montenegro, Concord, CA (US); Joseph Ng, San Mateo, CA (US); Damodar Raval, San Francisco, CA (US); Lisa Schur, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/202,014

(22) Filed: May 25, 2023

(65) Prior Publication Data

US 2023/0297981 A1    Sep. 21, 2023

Related U.S. Application Data

(63) Continuation of application No. 17/710,719, filed on Mar. 31, 2022, now Pat. No. 11,694,173, which is a
(Continued)

(51) Int. Cl.
| | |
|---|---|
| *G06Q 20/10* | (2012.01) |
| *G06K 7/10* | (2006.01) |

(Continued)

(52) U.S. Cl.
CPC ..... *G06Q 20/1085* (2013.01); *G06K 7/10297* (2013.01); *G06K 7/1417* (2013.01); *G07D 11/0087* (2013.01)

(58) Field of Classification Search
None
See application file for complete search history.

(56) References Cited

U.S. PATENT DOCUMENTS

| | | | |
|---|---|---|---|
| 7,513,419 B1 | 4/2009 | Crews et al. | |
| 7,992,777 B1 * | 8/2011 | Block | G07F 19/201 |
| | | | 235/379 |

(Continued)

FOREIGN PATENT DOCUMENTS

| | | | | |
|---|---|---|---|---|
| WO | WO-2016/010884 A1 | | 1/2016 | |
| WO | WO-2016010884 A1 * | | 1/2016 | ............ G06Q 30/06 |

OTHER PUBLICATIONS

Cashless Society "A Start-up That Wants to Make ATMs obsolete", Nov. 7, 2014, CNBC—Andrew Saleski, Retrieved from the Internet: https://www.cnbc.com/2014/11/07/a-start-up-that-wants-to-make-atms-obsolete.html (Year: 2014).*

(Continued)

*Primary Examiner* — Paul S Schwarzenberg
(74) *Attorney, Agent, or Firm* — Foley & Lardner LLP

(57) ABSTRACT

Systems, methods, and apparatuses described herein relate to a method for delivering cash to a user. The method includes receiving a cash delivery request from a first user device of the user. The method includes generating a cash authentication code (CAC) for the cash delivery request to be verified by a cash dispenser machine. The method may include transmitting the cash delivery request and the CAC to a second user device of a driver. The method may include determining a route for the driver from a first location of the driver, to a second location of a cash dispenser machine, and to a third location of the customer to deliver the cash delivery request. The method may include instructing the cash dispenser machine to dispense cash in response to authenticating the second user device based on the CAC and (Continued)

determining that the first current location is at the second location.

17 Claims, 7 Drawing Sheets

Related U.S. Application Data continuation of application No. 16/660,631, filed on Oct. 22, 2019, now Pat. No. 11,328,275.

(51) Int. Cl.
    *G06K 7/14*     (2006.01)
    *G07D 11/00*     (2019.01)

(56) References Cited

U.S. PATENT DOCUMENTS

| | | | |
|---|---|---|---|
| 8,494,956 B2 | 7/2013 | Tulluri et al. | |
| 8,505,814 B1 * | 8/2013 | Block | G07F 19/20 |
| | | | 235/379 |
| 8,955,741 B2 | 2/2015 | Hansen et al. | |
| 10,282,681 B2 | 5/2019 | Wang | |
| 10,453,041 B1 * | 10/2019 | Walker | G07F 19/206 |
| 2003/0069843 A1 * | 4/2003 | Kidd | G06Q 20/10 |
| | | | 705/39 |
| 2003/0229548 A1 | 12/2003 | Kakuta | |
| 2008/0235134 A1 | 9/2008 | Obadan | |
| 2013/0339235 A1 * | 12/2013 | Tulluri | G06Q 20/18 |
| | | | 705/43 |
| 2015/0294279 A1 | 10/2015 | Chevalier | |
| 2016/0012411 A1 * | 1/2016 | Kursun | G06Q 40/02 |
| | | | 705/42 |
| 2016/0078416 A1 * | 3/2016 | DeLuca | G07F 19/205 |
| | | | 705/43 |
| 2017/0124789 A1 * | 5/2017 | Rephlo | G06Q 10/083 |
| 2019/0122220 A1 * | 4/2019 | Phillips | G06F 21/6218 |
| 2019/0147421 A1 * | 5/2019 | Phillips | H04L 67/2838 |
| | | | 705/43 |
| 2019/0205850 A1 * | 7/2019 | Deluca | G07F 9/001 |

OTHER PUBLICATIONS

Caxton, "Cash Delivery" https://www.caxtonfx.com/currency-cards/cash-delivery/ 5 pages.

Zaleski, Andrew, "A start-up that wants to make ATMs obsolete", CNBC, Nov. 7, 2014. https://www.cnbc.com/2014/11/07/a-start-up-that-wants-to-make-atms-obsolete.html 10 pages.

* cited by examiner

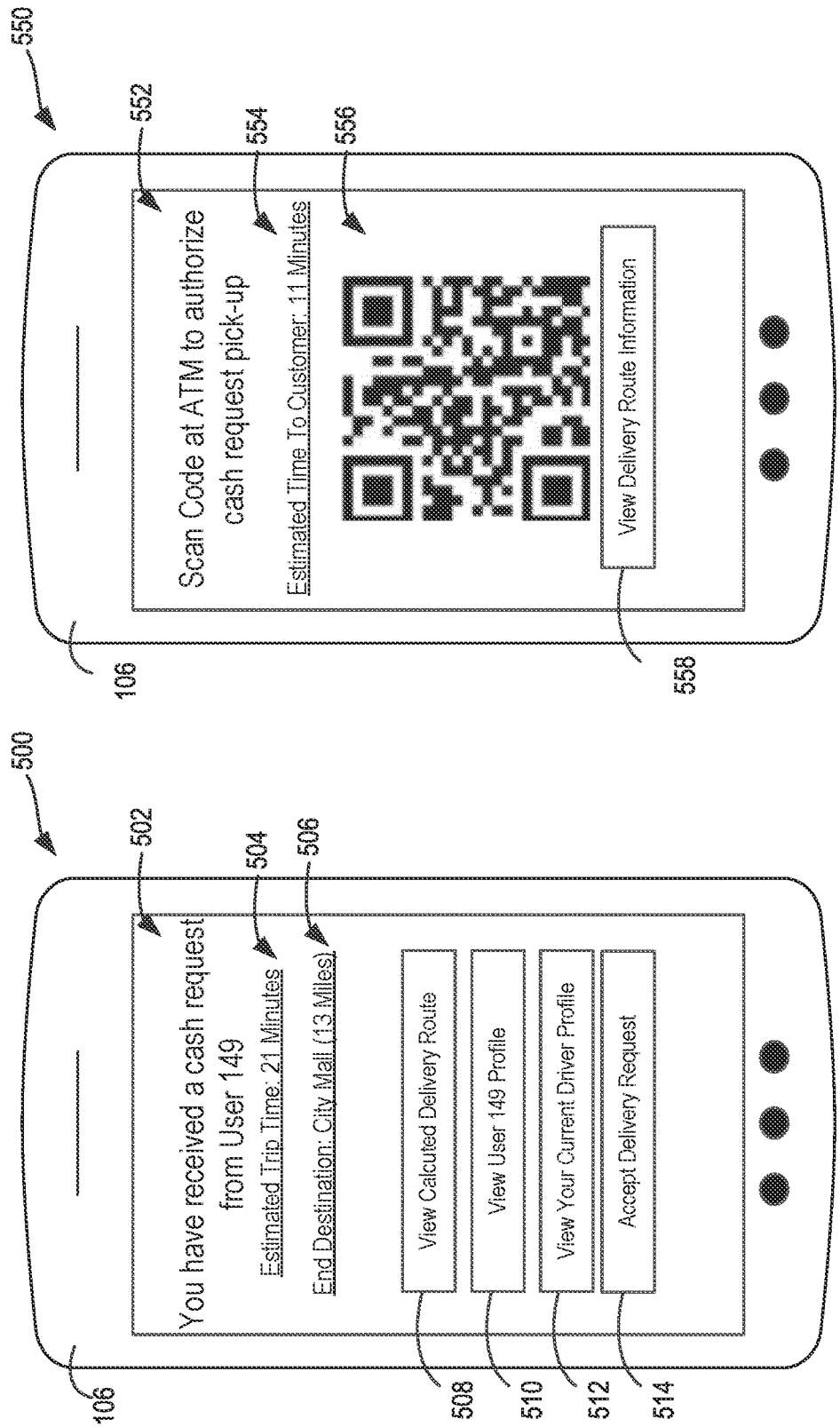

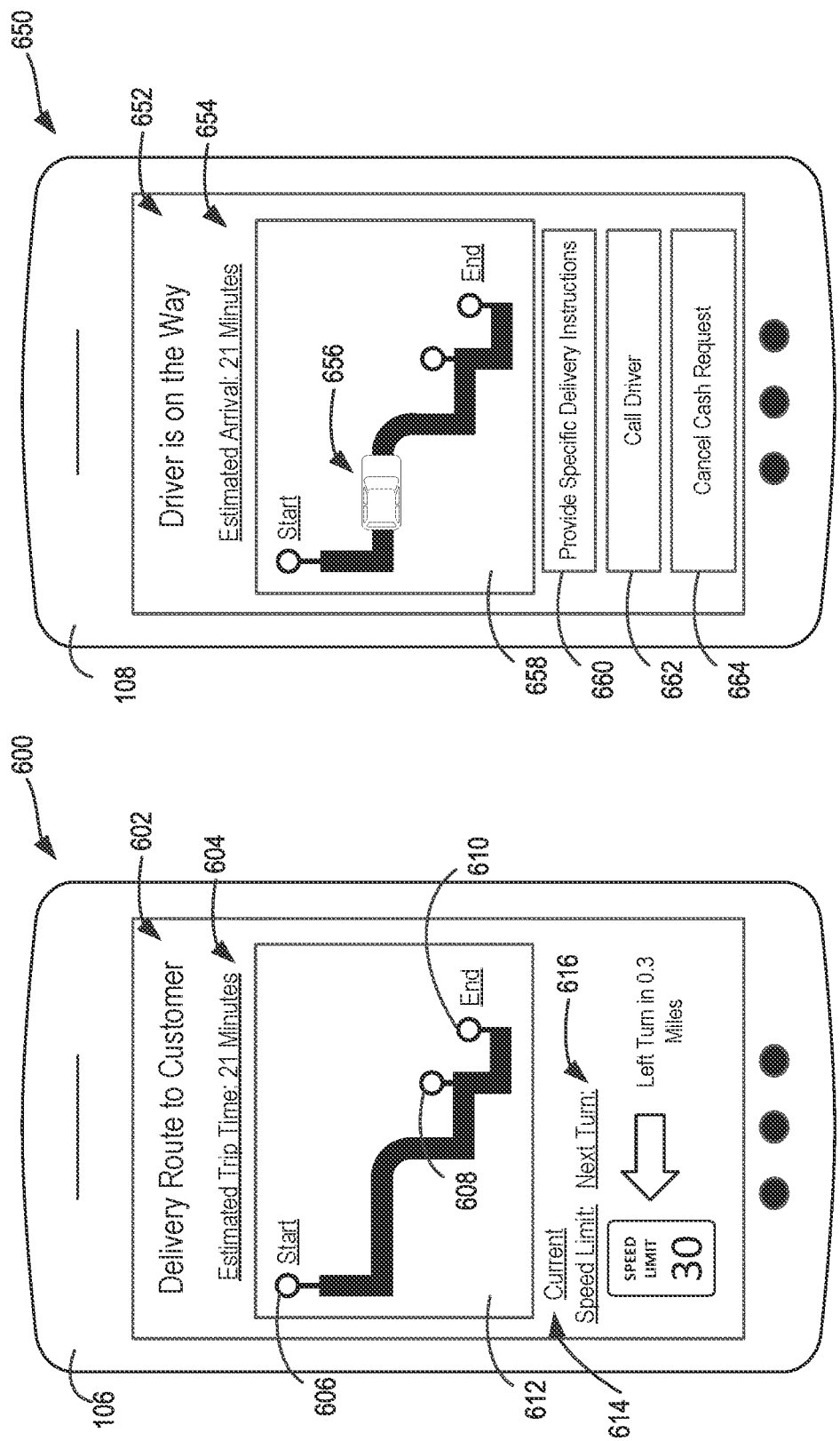

CASH DELIVERY APPLICATION

CROSS-REFERENCE TO RELATED APPLICATIONS AND CLAIM OF PRIORITY

This application is a continuation of U.S. patent application Ser. No. 17/710,719, entitled "Cash Delivery Application," filed on Mar. 31, 2022, which is a continuation of U.S. patent application Ser. No. 16/660,631, entitled "Cash Delivery Application," filed on Oct. 22, 2019, now issued as U.S. Pat. No. 11,328,275, each of which is incorporated herein by reference in its entirety and for all purposes.

BACKGROUND

Currently, a user who would like to receive cash typically has to spend time searching for an Automated Teller Machine (ATM) or bank branch of his or her financial institution in the user's vicinity, and then driving, walking, or taking other means of transportation to the ATM or the bank branch to enter his or her account information to withdraw cash. The user may be unaware of transaction fees charged when withdrawing cash and whether the ATM has sufficient funds to withdraw the amount of cash the user needs. As such, the user may waste a substantial amount of time in commuting to the location of the ATM to withdraw cash. Acquiring cash from an ATM tends to be an inconvenience for a user, and is sometimes not even an option for users who are unable to drive or commute to the location to get cash.

SUMMARY

In some arrangements, a method of delivering cash to a customer, the method including receiving, by a provider computing system, instructions from a first user device of the customer indicating a cash delivery request via a communications network, generating, by the provider computing system, a first cash authentication code (CAC) for the cash delivery request, the first CAC to be verified by a cash dispenser machine, transmitting, by the provider computing system, the cash delivery request and the first CAC to a second user device of a driver, in response to the first CAC being verified at the cash dispenser machine, the provider computing system generating a second CAC consisting of a QR code and transmitting the second CAC to the second user device of the driver, determining, by the provider computing system, a route for the driver from a current global positioning system (GPS) location of the second user device of the driver, to a GPS location of the cash dispenser machine, and to a GPS location of the first user device of the customer to deliver the cash delivery request, and sending, by the provider computing system, instructions through the communications network to the cash dispenser machine to dispense an amount of requested cash in response to authenticating the second user device based on the first CAC and determining that a current GPS location of the second user device is at the GPS location of the cash dispenser machine and the driver scanning the second CAC at the cash dispenser machine.

In some arrangements, a provider computing system of a provider institution including a network interface circuit configured to communicate with a first user device of a customer, a second user device of a driver, and a cash dispenser machine, and at least one processor operatively coupled to a non-transient memory to form a processing circuit. The processor configured to receive instructions from the first user device of the customer indicating a cash delivery request through a communications network, generate a first cash authentication code (CAC) for the cash delivery request, the first CAC to be verified by the cash dispenser machine, transmit the cash delivery request and the first CAC to the second user device of the driver, in response to the first CAC being verified at the cash dispenser machine, generate a second CAC consisting of a QR code and transmit the second CAC to the second user device of the driver, determine a route for the driver from a current global positioning system (GPS) location of the second user device of the driver, to a GPS location of the cash dispenser machine, to a GPS location of the first user device of the customer to deliver the cash delivery request, and send instructions through the communications network to the cash dispenser machine to dispense an amount of requested cash in response to authentication of the second user device based on the first CAC and a determination that a current GPS location of the second user device is at the GPS location of the cash dispenser machine and the driver scans the second CAC at the cash dispenser machine.

In some arrangements, a non-transitory computer-readable medium comprising computer-readable instructions such that, when executed by a processor, causes the processor to receive instructions from a first user device of a customer indicating a cash delivery request via a communications network, generate a first cash authentication code (CAC) for the cash delivery request, the first CAC to be verified by a cash dispenser machine, transmit the cash delivery request and the first CAC to a second user device of a driver, in response to the first CAC being verified at the cash dispenser machine, generate a second CAC consisting of a QR code and transmit the second CAC to the second user device of the driver, determine a route for the driver from a current global positioning system (GPS) location of the second user device of the driver, to a second location of the cash dispenser machine, and to a GPS location of the first user device of the customer to deliver the cash delivery request, and transmit instructions through the communications network to the cash dispenser machine to dispense an amount of requested cash in response to authenticating the second user device based on the first CAC and determining that a current GPS location of the second user device is at the GPS location of the cash dispenser machine and the driver sends the second CAC at the cash dispenser machine.

These and other features, together with the organization and manner of operation thereof, will become apparent from the following detailed description when taken in conjunction with the accompanying drawings.

BRIEF DESCRIPTION OF THE FIGURES

FIG. 5A and FIG. 5B are schematic drawings depicting example user interfaces of the driver user device used in the environment of FIG. 1, according to various arrangements.

FIG. 6A and FIG. 6B are schematic drawings depicting example user interfaces of the driver user device and the customer user device, respectively, used in the environment of FIG. 1, according to various arrangements.

DETAILED DESCRIPTION

Figure 1A:
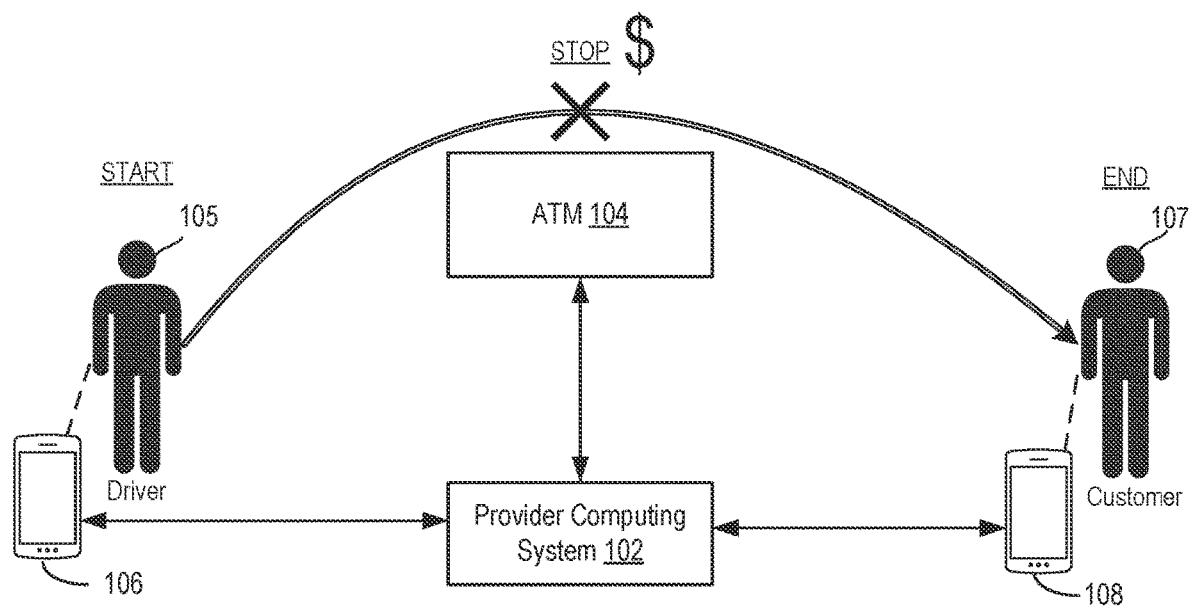
FIGS. 1A and 1B are block diagrams illustrating a system for generating and communicating a cash delivery request between user devices, an Automated Teller Machine (ATM) and a provider computing system, according to various arrangements.

Referring generally to the FIGS., arrangements described herein relate to various systems, apparatuses, methods, and non-transitory computer-readable media for securely and efficiently delivering cash to customers via a cash delivery mobile application. For example, a customer of a provider institution requests an amount of cash using a mobile application. In some examples, a route from a current location of the driver, to a cash dispenser machine, and finally, to the customer, is generated and displayed to the driver and the customer via their respective user devices, where the route is generated based on at least the location data provided by a driver user device of the driver, the location of the cash dispenser machine, and the location data provided by the customer user device of the customer. In some arrangements, a cash authentication code (CAC) is generated and sent to the user device of the driver to use at the cash dispenser machine in order for the cash dispenser machine to authenticate the correct driver before dispensing cash. In some examples, the same CAC is used to validate the correct customer receives the cash, via the driver user device and/or the customer user device. In other examples, in response to determining the driver user device and the customer user device are within a certain distance of one another, a different CAC is created and transmitted to the customer user device and/or the driver user device.

The systems and methods described herein overcome the inefficiencies of customers determining a location of a cash dispenser machine or branch bank in proximity to the customer and retrieving the cash by the customer. Conventionally, if a customer of a provider institution needs cash, the customer drives, walks, or uses another mode of transportation to get to a nearby cash dispenser machine, such as an ATM. In traditional systems, customers do not know if the cash dispenser machine has enough cash available to meet their needs, if extra fees are charged when the cash dispenser machine is used, or if other cash dispenser machines are nearby with access to more cash and/or less surcharges, until the customer has already made the effort to go to the cash dispenser machine. However, customers may not have the time to make the trip to the cash dispenser machine or may not have the capability to do so. For example, the customer may be in a hurry and need cash quickly before catching a flight, but may not have the time to make a trip to the nearest cash dispenser machine. In other examples, the customer may need cash to pay for a food delivery, but is recovering from an injury and cannot drive or walk themselves to get cash from a nearby cash dispenser machine. To address such issues, the system described herein can determine a route for delivering the cash to the customer based on one or more of a shortest path to the customer from where the delivery driver currently is located, which cash dispenser machines have a high enough balance to meet the cash needs of the customer, or which cash dispenser machines charge the least amount of fees to provide cash. In addition, customers may be wary of having cash delivered to them by the drivers (e.g., entrusting the drivers with a certain amount of cash). To address such worry, the systems and methods described herein can allow users of the cash delivery mobile application to provide reviews or ratings on drivers upon completion of the delivery. The reviews and ratings of the drivers can then be used to select a suitable driver for a cash delivery request with a specific amount. For example, cash delivery requests above $500 are reserved for drivers with a perfect rating for cash deliveries on a cash delivery mobile application. Furthermore, a two-step, location-based authentication process is used for verification during the cash exchange between the cash dispenser machine and the driver and during the exchange between the driver and the customer, which can provide additional security. Further details regarding the authentication process are disclosed in U.S. Patent Application, titled "AUTHENTICATION AT ATM AND HANDSHAKE BETWEEN CUSTOMER AND DRIVER," filed on Oct. 22, 2019, which is incorporated by reference herein in its entirety.

Referring to FIG. 1A, a block diagram of a cash delivery request system 101 is shown, according to some arrangements. The system 101 is shown to include at least a provider computing system 102, an ATM 104, a driver user device 106, and a customer user device 108. The driver user device 106 is used by a driver 105, and the customer user device is used by the customer 107. As referred to herein, the location of the driver 105 corresponds to the location of the driver user device 106 as determined from location data (e.g., GPS data) provided by the driver user device 106, where the driver 105 is assumed to be carrying the driver user device. Similarly, the location of the customer 107 corresponds to the location of the customer user device 108 as calculated from location data provided by the customer user device 108. In an example arrangement, the provider computing system is communicably connected to the ATM 104, the driver user device 106, and the customer user device 108 via a network. The customer 107, via the customer user device 108, makes a request for cash to be delivered to the location of the customer user device 108. The provider computing system 102 can process the cash delivery request and send a notification to the driver user device 106. The notification may include the request from the customer user device 108 and the route the driver 105 can take to the ATM 104 to retrieve the cash and to the location of the customer 107. In some arrangements, the provider computing system 102 broadcasts the cash delivery request to a network of driver user devices such as but not limited to, the driver user device 105. For simplification, only the single driver 105 and the driver user device 105 are shown in FIG. 1A. If the driver 105 accepts the processed cash delivery request from the provider computing system 102, a CAC can be sent to the driver user device 106 to use as verification at ATM 104 when the driver 105 arrives at the ATM 105 (e.g., when the location of the driver user device 106 is determined to be at the location of the ATM 104). In some arrangements, the CAC is a barcode, a quick response (QR) code, a one-time access code, a virtual card, a communication signal (e.g., a Near Field Communications (NFC) signal), or so on, as will be described in greater detail below. After the driver 105 finishes withdrawing the cash at the ATM 104, the driver 105 proceeds to the location of the customer user device 108 to deliver the cash. In various arrangements, the same CAC, or a new CAC, is used to verify the correct customer 107 who made the cash delivery request and also verify the correct driver 105.

Figure 1B:
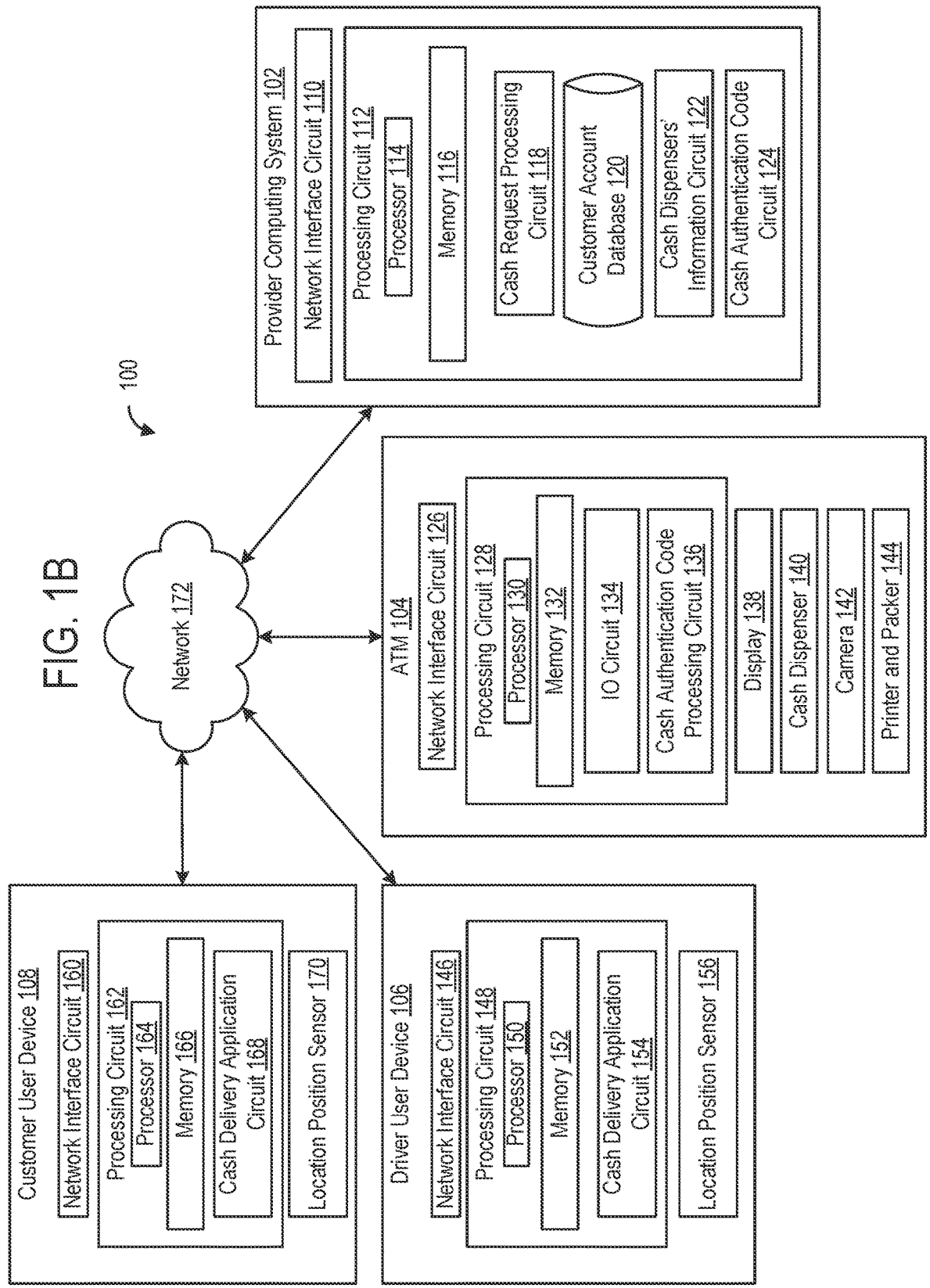

Referring to FIG. 1B, a block diagram of a cash delivery request system 100 is shown, according to an example arrangement. As described in further detail below, the system 100 facilitates the generation, acceptance, and authentication of a request for cash from a customer of the provider institution. As shown, the system 100 includes a provider computing system 102 communicably and operatively coupled with the ATM 104, the driver user device 106, and the customer user device 108 over a network 172. The network 172 provides communicable and operative coupling between the provider computing system 102, the ATM 104, the driver user device 106, the customer user device 108, and other components disclosed and described herein to provide and facilitate the exchange of communications (e.g., data, instructions, messages, values, commands). Accordingly, the network 172 may include any network including wired (e.g., Ethernet) and/or wireless networks (e.g., 802.11X, ZigBee, Bluetooth, WiFi). In some arrangements, the network 172 includes the Internet. In other arrangements, the network 172 includes a proprietary banking network to provide secure or substantially secure communications between provider computing system 102, ATM 104, driver user device 106, and customer user device 108.

The provider computing system 102 is operated by a provider, which is an entity that facilitates various types of transactions between the ATM 104, driver user device 106, customer user device 108, and various other entities not explicitly described or shown herein. The provider institution may be a bank, credit union, a payment services company, or other similar entities. The provider computing system 102 includes, among other systems, a network interface circuit 110 enabling the provider computing system 102 to exchange data over network 172 and a processing circuit 112.

The network interface circuit 110 includes program logic that facilitates connection of the provider computing system 102 to the network 172. The network interface circuit 110 supports communication between the provider computing system 102 and other systems, such as the ATM 104, the driver user device 106, and the customer user device 108. For example, the network interface circuit 110 includes an Internet modem, a cellular modem, a Bluetooth transceiver, a Bluetooth beacon, and so on. In some arrangements, the network interface circuit 110 communicates via a secure wired connection within a branch of a provider (e.g., a financial institution) associated with the provider computing system 102. In some arrangements, the network interface circuit 110 includes the hardware and machine-readable media sufficient to support communication over multiple channels of data communication. Further, in some arrangements, the network interface circuit 110 includes cryptography capabilities to establish a secure or relatively secure communication session with the provider computing system 102, ATM 104, driver user device 106, and customer user device 108. In this regard, financial data (and/or other types of data) may be encrypted and transmitted to prevent or substantially prevent the possibility of hacking system 100 to access the financial data of the provider institution associated with the provider computing system 102.

The processing circuit 112 includes a processor 114 and memory 116. The processor 114 may be implemented as one or more application specific integrated circuits (ASICs), field programmable gate arrays (FPGAs), a group of processing components, or other suitable electronic processing components. Memory 116 may be one or more devices (e.g., RAM, ROM, Flash memory, hard disk storage) for storing data and/or computer code for completing and/or facilitating the various processes described herein. Memory 116 may be or include non-transient volatile memory, non-volatile memory, and non-transitory computer storage media. Memory 116 may include database components, object code components, script components, or any other type of information structure for supporting the various activities and information structures described herein. Memory 116 may be communicably coupled to the processor 114 and include computer code or instructions for executing one or more processes described herein.

The provider computing system 102 includes a cash request processing circuit 118 configured to manage, generate, transmit, and evaluate requests for cash from the cash delivery application. Accordingly, the cash request processing circuit 118 is communicatively coupled to the ATM 104, the driver user device 106, and the customer user device 108. The cash request processing circuit 118 can be configured to receive a request to generate a cash delivery associated with an amount of cash to withdraw from a cash dispenser machine (e.g., ATM 104) and transmit the cash delivery request to drivers via user devices of the drivers (e.g., driver user device 106). While ATM 104 is described as an example of a cash dispenser machine, other cash dispenser machines may include cash lockers, a POS device, or any other machine associated with the provider institution that dispenses cash. For example, the cash dispenser machine may be a cash lockbox structured to facilitate a transaction, for example, a withdrawal or currency exchange. In some arrangements, the cash lockbox includes a camera, a sensor and a locking mechanism. In some arrangements, the cash lockbox has an ATM-like device inside of it to facilitate dispensing cash. The device may be connected to a repository of cash or each cash lockbox may store the cash within itself, being loaded by an employee of the provider institution at the cash lockbox location or through other automated mechanisms. In other arrangements, the cash lockbox may contain open space for which a user can remove currency (e.g., the cash lockbox may be similar to a locker). The cash lockbox may be configured to incorporate various passcode options and a variety of input devices. In some arrangements, the outside of the cash lockbox has a biometric sensor, a card reader, a keypad, a bar code sensor, a fob sensor, or the like. In other arrangements, a single input terminal for the lockbox location allows a user to select a lockbox number and provide the authentication input. In some arrangements, the passcode options available to the user are limited to the available lockbox authentication devices on the cash lockboxes at the selected cash lockbox location.

In other arrangements, the cash dispenser machine may be a POS device instead of the ATM 104. A POS device can include any type of computing device that may be used to conduct financial transactions. In some arrangements, the POS device may be a POS terminal (e.g., a checkout computing system, a self-service checkout register, a drive-through terminal, etc.) configured to facilitate a transaction for goods associated with the provider institution or a third-party retailer. The POS device may allow a user to withdraw cash (e.g., withdrawing cash from the locked box in a checkout register).

As will be described in greater detail below, the cash request processing circuit 118 receives a signal indicating a request for cash to be delivered (e.g., from customer user device 108), generates the cash delivery request with information on where the customer currently is located based on location data (e.g., GPS data) received from the customer user device 108, how much cash is being requested, a calculated route to deliver the cash, and transmits the processed cash delivery request to one or more driver user devices 106. In some arrangements, the cash request processing circuit 118 is configured to receive data from customer account database 120, cash dispensers' information circuit 122, and CAC circuit 124 in order to finish processing the cash delivery request from customer user device 108. For example, the cash delivery request can use acquired data from cash dispensers' information circuit 122 on the location of several cash dispensers when calculating the delivery route to send in the processed cash delivery request. Further, CAC circuit 124 can generate a CAC to use for verification of the driver 105 at the cash dispenser machine (e.g., ATM 104) and/or a CAC to use for verification between the driver 105 and the customer 107 to send in the processed cash delivery request as well.

The provider computing system 102 is also shown to include a customer account database 120 which can be configured to store a plethora of information regarding customers of the provider institution. In some arrangements, customer account database 120 contains user profiles, personal information (e.g., names, nicknames, addresses, pictures, personal preferences, etc.), transaction history, account data, and other data the provider institution collects and saves regarding customers. For example, a customer may have a personal preference for a driver they want to deliver the cash request (e.g., only drivers with above a 4 out of 5 star rating, only drivers above a certain age, etc.), which can be stored in customer account database 120. Customer account database 120 can store account information relating to accounts held by the customer (e.g., customer 107) with the provider institution. In some examples, customer account database 120 is accessed to determine a bank account number of the customer 107 when the cash request processing circuit 118 generates the processed cash delivery request.

The provider computing system 102 further includes a cash dispensers' information circuit 122, in some examples. Cash dispensers' information circuit 122 can be configured to manage data regarding various cash dispenser machines associated with the provider institution. In some arrangements, cash dispenser machines are ATMs (e.g., the ATM 104), POS devices, cash lockers, or any other machine that has the input and output capabilities to dispense cash to users of the provider institution. In various examples, cash dispensers' information circuit 122 tracks data on the available funds at each cash dispenser machine, the fees charged at each cash dispenser machine for withdrawing cash, the location of each cash dispenser machine, and the functionality of each cash dispenser machine (e.g., whether the cash dispenser machine has operating input/output devices, cash dispenser, display, printer and packer, etc.). The cash dispenser machines associated with the provider institution may have a GPS location that can be tracked by cash dispensers' information circuit 122, or can be connected to network 172 and tracked using WiFi triangulation. The location data of the various cash dispenser machines can be analyzed by cash request processing circuit 118 in calculating the nearest cash dispenser machine with respect to the driver user device 106 and the customer user device 108, or can be used once a cash dispenser machine is chosen by cash request processing circuit 118 in determining the route for the driver 105 from the location of the driver user device 106, to the chosen cash dispenser machine (e.g., ATM 104) to stop to withdraw the cash, to the end destination of the customer user device 108 to deliver the cash to the customer 107.

The system 100 is also shown to include the ATM 104. In general, the ATM 104 is a computing system structured to provide an interface between the user of driver user device 106 (e.g., driver 105) and the provider computing system 102, allowing the driver 105 to retrieve the withdrawn cash to deliver to the customer 107 of the provider institution. For example, in various arrangements, the ATM 104 is configured to allow a user not associated with a bank account (e.g., a checking account being used to withdraw from) to pick up cash withdrawn from the account after authenticating the driver user device 106, indicating the driver 105 is supposed to be retrieving the cash on behalf of the customer 107.

As shown, and for the purpose of clarity, the disclosure contained herein is in reference to a single ATM 104. This depiction is for illustrative purposes only to show an implementation environment of the systems and methods described herein. It should be understood that the provider computing system 102 may be communicably and operatively coupled with multiple ATMs that may have the same or similar characteristics as illustrated with the example arrangement of ATM 104. The ATM 104 is shown to include a network interface circuit 126 that facilitates connection of the ATM 104 to the network 172. The network interface circuit 126 of the ATM 104 is adapted for and configured to establish a communication session via the network 172 between the ATM 104 and other systems, such as the provider computing system 102, the driver user device 106, and the customer user device 108. Accordingly, the network interface circuit 126 includes any of a cellular transceiver (Code Division Multiple Access (CDMA), Global System for Mobile Communications (GSM), Long-Term Evolution (LTE)), a wireless network transceiver (e.g., 802.11X, ZigBee, Bluetooth), or a combination of various transceivers (e.g., both a cellular transceiver, a Bluetooth transceiver, and a NFC transceiver). In some arrangements, the network interface circuit 126 communicates via a secured wired connection within a branch of the provider institution associated with the provider computing system 102. The network interface circuit 126 may be the same or similar as the network interface circuit 110 previously described with reference to the provider computing system 102.

The ATM 104 is also shown to include a processing circuit 128 including a processor 130 and memory 132. The processing circuit 128, processor 130, and memory 132 may be the same or similar as the processing circuit 112, processor 114, and memory 116 described respectively with reference to the provider computing system 102. The ATM 104 is shown to include an input/output (TO) circuit 134 structured to receive and provide communications to a user (e.g., the driver 105 retrieving the cash for the cash delivery request) of the ATM 104 (or, to another entity such as the provider computing system 102). In this regard, the IO circuit 134 is structured to exchange data, communications, instructions, etc. with the driver user device 106 and/or the driver 105. Accordingly, in one arrangement, the IO circuit 134 includes an input/output device such as a display device, a touchscreen, a keyboard, a microphone, a barcode scanner, and/or a quick response (QR) code scanner. In various arrangements, the IO circuit 134 includes communication circuitry for facilitating the exchange of data, values, messages, and the like between an input/out device and the components of the ATM 104. In some arrangements, the IO circuit 134 includes machine-readable media for facilitating the exchange of information between the input/out device and the components of the ATM 104. In still another arrangement, the IO circuit 134 includes any combination of hardware components (e.g., a touchscreen), communication circuitry, and machine-readable media.

The IO circuit 134 includes hardware structured to facilitate input of a CAC by scanning the CAC on a display of driver user device 106 and/or by manual input by the driver 105 or other user designated to retrieve the cash delivery request. In some arrangements, the IO circuit 134 includes a keypad structured to facilitate manual input of the CAC by the driver 105. For example, a driver inputs a CAC of an alphanumeric code displayed on driver user device 106 using a keypad provided by the IO circuit 134. In other arrangements, the IO circuit 134 includes a scanner structured to read the CAC (e.g., a one-time passcode, a QR code, a barcode, etc.), which can be presented to the scanner via a display screen of driver user device 106. For example, the driver 105 presents a QR code that is generated on an interface of driver user device 106 to the scanner provided by the IO circuit 134 for reading of the QR code by the scanner. In some arrangements, the hardware provided by the IO circuit 134 with which the driver 105 can input the CAC depends on the type (e.g., a one-time passcode, a QR code, barcode, alphanumeric, etc.) of CAC received by the driver user device 106.

In various arrangements, the IO circuit 134 provides components, devices, and/or hardware to facilitate authorization of identification of the driver 105 retrieving the cash delivery request. For example, the generated CAC can include driver authentication (e.g., biometric scan, facial recognition, PIN input, virtual ID card) to confirm the identification of the driver 105 associated with the specific cash delivery request. As such, the IO circuit 134 includes one or more components, devices, and corresponding hardware to verify such identification of the driver 105. The types of components, devices, and hardware provided by the IO circuit 134 are configurable based on the structure of ATM 104 and/or provider preference. For example, a provider institution favors requiring facial recognition of the driver before cash is dispensed for the cash delivery request, and based on the facial recognition preference, the IO circuit 134 includes a camera 142 and the corresponding hardware to facilitate a facial recognition process.

The ATM 104 is also shown to include a CAC processing circuit 136, which can be configured to receive a CAC and verify the CAC to determine whether to dispense cash for the cash delivery request. In some arrangements, the CAC processing circuit 136 communicates with IO circuit 134 to receive the CAC from the driver user device 106 and/or the driver 105. Accordingly, the CAC processing circuit 136 is communicably and operatively coupled to the IO circuit 134. In such arrangements, the CAC processing circuit 136 is configured to decipher data (e.g., the cash amount for the associated cash delivery request, driver identification requirements, etc.) from an entered CAC. In several arrangements, the CAC processing circuit 136 is configured to receive and decipher various types of codes in a CAC (e.g., a one-time passcode, a barcode, QR code, alphanumeric, etc.). The provider computing system 102 can generate a unique QR code, barcode, one-time passcode, etc. that is unique to the transaction (e.g., for the authentication at the ATM). In various arrangements, the CAC processing circuit 136 communicates with the CAC circuit 124 to validate the CAC by the provider computing system 102 in order to verify the correct driver 105 at the ATM 104. As such, the CAC processing circuit 136 is also communicably coupled to the CAC circuit 124. For example, CAC processing circuit 136 transmits a CAC to the CAC circuit 124 to decide, by the CAC circuit 124, if the particular CAC exists for a current, ongoing cash delivery request. Additionally, the CAC processing circuit 136 communicates with the CAC 124 of provider computing system 102 to confirm the identification of the driver 105 to guarantee the driver has the right authority to pick up the withdrawn cash. In some examples, in order for the ATM 104 to dispense the cash amount for the cash delivery request, the driver 105 enters a PIN provided by an interface of driver user device 106. Accordingly, the CAC processing circuit 136 receives the PIN and communicates with the provider computing system 102 to confirm whether the driver 105 has the correct identification (e.g., PIN) to withdraw cash.

The ATM 104 includes a display 138 used to present customer information, transaction information, and the like to users of the ATM 104. In this regard, the display 138 is communicably and operatively coupled to the IO circuit 134 to provide a user interface for receiving and displaying information on the ATM 104. Examples of user interfaces include digital screens, lights, voice instructions, etc. In various arrangements, the display 138 provides instructions (e.g., determined by the IO circuit 134, determined by the CAC processing circuit 136) to the driver 105 for facilitating withdrawing cash for the delivery request. For example, the display 138 presents an instruction to the driver 105 requesting that the driver 105 inputs a CAC or scans (via a scanner provided by the IO circuit 134) a CAC. In this regard, the display 138 may be configured to display information (e.g., customer profile details, route location details associated with the cash delivery request) correlating to the CAC entered by the driver 105. In some arrangements, the IO circuit 134 is configured to send only information on the customer 107 to display 138 that the driver 105 already has access to (e.g., a name), and does not display any of customer 107's financial data (e.g., customer account numbers or the amount of cash being withdrawn for the cash delivery request).

As shown, the ATM 104 includes a cash dispenser 140 configured to dispense a predetermined amount of cash to a user of the ATM 104. In this regard, the cash dispenser 140 is communicatively and operatively coupled to the IO circuit 134 and the CAC processing circuit 136 to dispense an amount of cash associated with the CAC. For example, after facial recognition of the driver 105 is completed via camera 142 and the CAC processing circuit 136 receives confirmation from the provider computing system 102 that the driver 105 is authenticated, the amount of cash specified in the cash delivery request by the customer 107 is dispensed. The ATM 104 also includes a printer and packer 144 configured to operate with the cash dispenser 140 to print envelopes, pack the dispensed cash within the envelopes, and seal the envelopes before dispensing to the driver 105. Printer and packer 144 can also be configured to print a new CAC received from CAC processing circuit 136 on the front of an envelope with the cash for the cash delivery request inside. In some arrangements, printer and packer 144 print the same CAC received from the driver user device 106 at the ATM 104 on the front of the sealed envelope. Therefore, printer and packer 144 is communicatively and operatively coupled to the CAC processing circuit 136.

The system is also shown to include a driver user device 106, which is a computing device associated with a user (e.g., the driver 105 or another designee to deliver the cash request). The driver user device 106 includes any type of computing device that is used to interact with online applications and/or receive information from the provider computing system 102, the ATM 104, and/or the customer user device 108. In some arrangements, the driver uses the driver user device 106 to both communicate information to the provider computing system 102 over the network 172, as well as communicate information with the ATM 104 and customer user device 108. In this regard, the driver user device 106 may include any wearable or non-wearable device. Wearable devices refer to any type of device that an individual wears including, but not limited to, a watch (e.g., a smart watch), glasses (e.g., eye glasses, sunglasses, smart glasses), bracelet (e.g., a smart bracelet), etc. The driver user device 106 may also include any type of mobile device including, but not limited to, a phone (e.g., smart phone), table, personal digital assistant, and/or computing devices (e.g., desktop computer, laptop computer, personal digital assistant).

In the example arrangement of FIG. 1, the driver user device 106 includes a network interface circuit 146 enabling the user device 106 to exchange information over the network 172, a processing circuit 148, and a location position sensor 156. The processing circuit 148 is shown to include a processor 150 and memory 152. The processing circuit 148, processor 150, and memory 152 may be the same or similar as the processing circuit 112, processor 114, and memory 116 respectively described with reference to the provider computing system 102.

The network interface circuit 146 of the driver user device 106 is adapted for and configured to establish a communication session via the network 172 between the driver user device 106 and other systems, such as the provider computing system 102, ATM 104, and the customer user device 108. Accordingly, the network interface circuit 146 includes any of a cellular transceiver (CDMA, GSM, LTE, a wireless network transceiver (e.g., 802.11X, ZigBee, Bluetooth), or a combination of various transceivers (e.g., both a cellular transceiver, a NFC transceiver, and a Bluetooth transceiver). In some arrangements, the network interface circuit 146 communicates via a secured wired connection within a branch of the provider associated with the provider computing system 102. The network interface circuit 146 may be the same or similar as the network interface circuit 110 previously described with reference to the provider computing system 102.

The cash delivery application circuit 154 is structured to provide displays to the driver user device 106 that enable the driver to use an application to manage cash delivery requests associated with the provider institution. Accordingly, the cash delivery application 154 is communicably and operatively coupled to the provider computing system 102. In some arrangements, the cash delivery application circuit 154 may be incorporated with an existing application in use by the provider institution (e.g., a mobile banking application or a mobile wallet application) or may be incorporated with an existing third-party application (e.g., a mobile ride sharing application). In other arrangements, the cash delivery application circuit 154 may be downloaded by the driver user device 106 prior to its usage, hard-coded into the memory 152 of the driver user device 106, or be a web-based interface application, which may be executed remotely from the driver user device 106. In the latter instance, the user may have to log onto or access the web-based interface before usage of the application. Further, and in this regard, the cash delivery application circuit 154 may be supported by a separate computing system including one or more servers, processors, network interface circuits, etc. that transmit applications for use to the driver user device 106. In certain arrangements, the cash delivery application circuit 154 includes an API and/or a software development kit (SDK) that facilitate the integration of other applications with the cash delivery application circuit 154.

In various arrangements, and as will be described in greater detail with the various use-case scenarios below, the cash delivery application circuit 154 is configured to present to customers of the provider institution an application to send and receive requests for a cash delivery via a user interface of a user device (e.g., driver user device 106 or the customer user device 108). In such arrangements, the cash delivery application circuit 154 is communicatively coupled to the network interface circuit 146 and the location position sensor (e.g., location position sensor 156) of the user device in order to transmit the cash delivery request to the provider computing system 102. The cash delivery application circuit 154 may be configured to track the position of the user device (e.g., the driver user device 106) using data acquired from the location position sensor 156. Using the location information received from one or more driver user devices, the provider computing system 102 may determine which drivers to send a generated cash delivery request to by calculating the distance between the location of the customer user device 108 and the location of the one or more driver user devices 106. In some arrangements, the cash delivery application circuit 154 presents the driver of a cash delivery request with several options to accept, cancel, and view further details on a request the driver 105 is in the process of delivering to the customer 107. For example, the drivers for a currently unaccepted cash delivery request are presented with one or more options including, but not limited to, viewing the driver profile, viewing a customer profile for the user who made the cash delivery request, viewing the calculated delivery route, accepting the cash delivery request, and viewing the delivery route information. In another example, a driver who does not hold a driver's account with the provider is presented with the option to register to drive for the cash delivery service associated with the provider institution. In some arrangements, the driver 105 may also hold an account (e.g., a savings account, a credit account, a checking account) with the provider institution associated with the provider computing 102 and want to make cash delivery requests as well. In this case, the driver 105 may toggle between a customer of the cash delivery application or a driver for the cash delivery application via a user interface presented by the cash delivery application circuit 154.

The location position sensor 156 of driver user device 106 is structured to receive location data and determine a location or receive information indicative of a location of the user device 106. In one arrangement, the location position sensor 156 includes a global position system (GPS) or any other type of location position system. As such, the location position sensor 156 receives latitude data, longitude data, and other types of location or position data to determine the location of the driver user device 106. In other arrangements, the location position sensor 156 receives an explicit location identification from the driver 105 of the driver user device 106. All such variations are intended to fall with the spirit and scope of the present disclosure.

The system is also shown to include a customer user device 108, which is a computing device associated with a user (e.g., the customer of the provider institution making the request for cash). The customer user device 108 may include any type of computing device that is used to interact with online applications and/or receive information from the provider computing system 102, the ATM 104, and/or the driver user device 106. In some arrangements, the customer uses the customer user device 108 to both communicate information to the provider computing system 102 over the network 172 as well as communicate information with the ATM 104 and the driver user device 106. In this regard, the customer user device 108 may include any wearable or non-wearable device. Wearable devices refer to any type of device that an individual wears including, but not limited to, a watch (e.g., a smart watch), glasses (e.g., eye glasses, sunglasses, smart glasses), bracelet (e.g., a smart bracelet), etc. The user device may also include any type of mobile device including, but not limited to, a phone (e.g., smart phone), table, personal digital assistant, and/or computing devices (e.g., desktop computer, laptop computer, personal digital assistant). The customer user device 108 may be the same or similar as the driver user device 106 previously described.

In the example arrangement of FIG. 1, the customer user device 108 includes a network interface circuit 160 enabling the customer user device 108 to exchange information over the network 172, a processing circuit 162, and a location position sensor 170. The processing circuit 162 is shown to include a processor 164, memory 166, and cash delivery application circuit 168. The processing circuit 162, processor 164, and memory 166 may be the same or similar as the processing circuit 112, processor 114, and memory 116 respectively described with reference to the provider computing system 102. The cash delivery application circuit 168 may be the same or similar as the cash delivery application 154 of the driver user device 106.

The network interface circuit 160 of the customer user device 108 is adapted for and configured to establish a communication session via the network 172 between the customer user device 108 and other systems, for example, the provider computing system 102, the ATM 104, and the driver user device 106. Accordingly, the network interface circuit 160 includes any of a cellular transceiver (CDMA, GSM, LTE, a wireless network transceiver (e.g., 802.11X, ZigBee, Bluetooth), or a combination of different transceivers (e.g., both a cellular transceiver, NFC transceiver, and a Bluetooth transceiver). In some arrangements, the network interface circuit 160 communicates via a secured wired connection within a branch of the provider institution associated with the provider computing system 102. The network interface circuit 160 may be the same or similar as the network interface circuit 110 previously described with reference to the provider computing system 102.

In various arrangements, the location data received by the location position sensor 170 is used (e.g., by the cash delivery application circuit 168 and/or by the provider computing system 102) to determine one or more ATMs (e.g., ATM 104) associated with the provider institution of the provider computing system 102 that are nearest the customer. In such arrangements, the cash delivery application circuit 168 presents the one or more ATMs nearest the customer 107 to provider computing system 102 to use in determining a route for the driver 105 to stop at one of the one or more ATMs before delivering the cash request to the customer 107. The location data received by the location position sensor 170 can be used by the provider computing system 102 and the driver user device 106 for tracking the current location of the customer user device 108. In this regard, the provider computing system 102 can determine which driver user devices 106 are nearest the user and can use the location of the customer user device 108 as the end destination when determining the delivery route (e.g. by cash request processing circuit 118).

Figure 2:
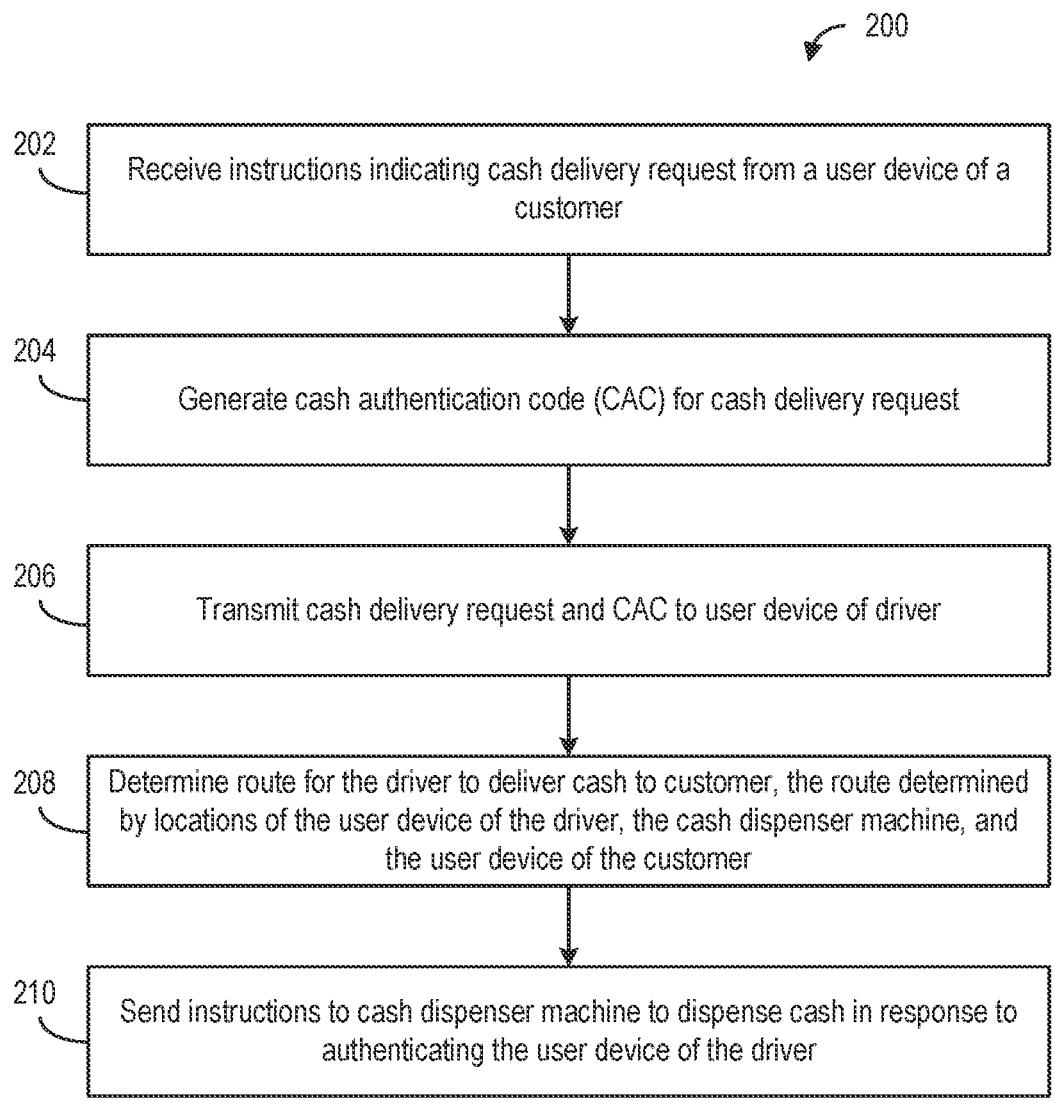
FIG. 2 is a flow diagram illustrating a method for receiving a cash delivery request from a customer and delivering cash to the customer, according to various arrangements.
Figure 4:
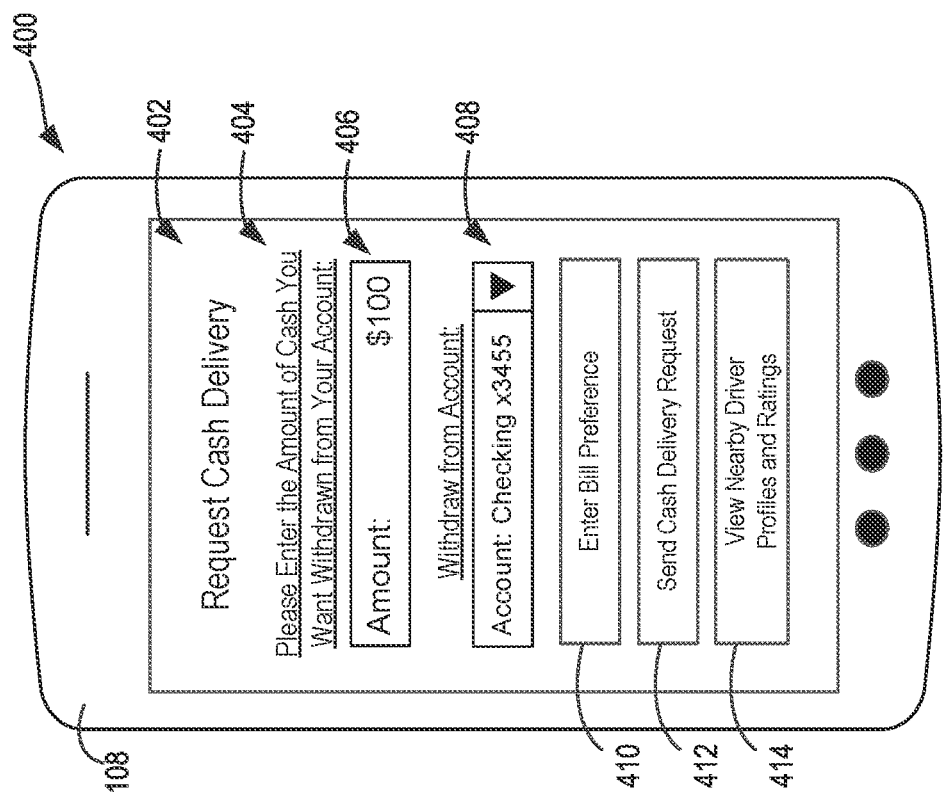
FIG. 4 is a schematic drawing depicting an example user interface of the customer user device used in the environment of FIG. 1, according to various arrangements.

Referring to FIG. 2, a flow diagram illustrating a method 200 for processing a request for cash and delivering the request to the customer 107 (FIG. 1) is depicted, according to various arrangements. Referring to FIGS. 1A-2, the method 200 is performed by the provider computing system 102. At 202, the cash request processing circuit 118 may be configured to receive instructions indicating a cash delivery request from the customer user device 108 of the customer 107. In some examples, the cash delivery request is received from customer user device 108 via a user interface such as but not limited to, user interface 400 (FIG. 4). The cash delivery request can provide details on the amount of cash the customer 107 needs, the current GPS location of customer user device 108, and personal preferences of the customer 107 (e.g., a specific driver the customer saw on social media in the nearby drivers network, bill preferences for the cash to withdraw, whether the customer 107 needs the cash as soon as possible or prefers a lower fee for having the cash delivered, and so on). In some arrangements, once the cash delivery request is received, the provider computing system 102 may access the customer account database 120 to retrieve additional information on the user who made the request, such as but not limited to, previous cash delivery requests, personal information, account information for the provider institution, and so on. The amount to withdraw specified in the cash delivery request may be tokenized by the cash request processing circuit 118 before the cash delivery request is broadcast to any driver user devices.

At 204, the CAC circuit 124 is configured to generate a CAC for the cash delivery request received from customer user device 108. In some examples, the CAC includes one or more of a barcode, a QR code, a one-time access code, a virtual card to be used at the cash dispenser machine (e.g., ATM 104) by the driver 105, a communication signal (e.g., a NFC signal), or so on. The virtual card may be a virtual identity card that allows the driver 105 to continuously authenticate and conduct cash delivery requests with customers of the provider institution. The virtual identity card represents a driver's personal identity information through a driver user device linked to a driver's account for the online cash delivery application or the provider institution. The virtual identity card is a method of identification for P2P (peer-to-peer), P2B (peer-to-business) and other kinds of transactions. The driver 105 can register a virtual identity card by providing necessary authentication information (e.g., birth certificates, financial statements, state-issued licenses, biometrics, and so on) to have the virtual identity card issued by the provider computing system 102. In response to an initiated cash delivery request, the provider computing system can issue the virtual identity card in any appropriate manner to authenticate the driver 105, either to the driver user device 106, a relying party (e.g., a merchant that operates the POS device), a provider institution bank branch, a cash dispenser machine (e.g., the ATM 104), and the like. In some arrangements, the virtual identity card is saved in the local memory 152 of the driver user device 106 after the provider computing system issues the virtual identity card to the driver 105. In other examples, the virtual identity card can be reissued and transmitted to the driver user device 106 each time the driver 105 accepts a new cash delivery request to deliver. In some implementations, the virtual identity card to use at cash dispenser machines is issued when the driver 105 registers for the delivery service with the provider institution. In various arrangements, the CAC is sent to driver user device 106 after the driver 105 first passes a preliminary verification of the driver's identification. For example, the driver 105 first types in a driver identification number or a government-issued ID number owned by the driver 105 at ATM 104 via a keyboard of the ATM before the CAC is sent to driver user device 106. In other examples, ATM 104 does a preliminary verification of the driver 105 using facial recognition or another biometric scan (e.g., biometric scan of the driver 105's fingerprint). The generated CAC may be used only once at the ATM before the CAC expires or, in other implementations, the same CAC may be used again by the driver 105 to verify the customer 107 when delivering the cash. In some examples, the cash dispenser machines (e.g., the ATM 104) can detect a broadcasted CAC (e.g., NFC signals broadcasted by the driver user device 106), for example, when the driver user device 106 is within a predetermined distance of the cash dispenser machine (e.g., 5 feet of the ATM 104).

At 206, the network interface circuit 110 is configured to transmit the cash delivery request and CAC to the driver user device 106 of the driver 105. In some arrangements, the cash delivery request is first sent to a plurality of driver user devices for drivers connected to a delivery network. The network 172 may track the locations of the one or more drivers in the delivery network by monitoring the GPS signals of the devices of the drivers. The provider computing system 102 can monitor the locations of these drivers by receiving, periodically, location data (e.g., GPS data) from each of the drivers' devices. In some examples, once one of the drivers in the delivery system network accepts the cash delivery request, the CAC can be delivered via network 172 to the driver (e.g., driver 105) who will deliver the cash request to the customer 107. In other arrangements, as soon as the driver 105 registers for the delivery application offered by the provider institution, a CAC is transmitted to the driver user device 106 (e.g., a virtual card is issued to the driver 105 when they register as a driver). In this case, when new cash delivery requests are made, an additional CAC can be sent to the driver user device 106 and the virtual card can be updated to include the individual second CAC (e.g., a one-time use sub-number access code) for the current cash delivery request. In other examples, the CAC is not delivered to the driver user device 106 until step 210 when the cash dispenser machine (e.g., the ATM 104) first detects that the driver user device 106 is within a predetermined distance (e.g., 10 feet of the ATM 104).

At 208, the cash request processing circuit 118 is configured to determine a route for the driver 105 to take in order to deliver cash to the customer 107. The route for the driver 105 can be determined by locations of the driver user device 106, the cash dispenser machine (e.g., the ATM 104), and the customer user device 108. In some arrangements, the route for the driver to deliver the cash is determined based on which route will have the quickest delivery time to the customer, which route will have the lowest total fees for withdrawing cash from a cash dispenser machine (e.g., an ATM transaction fee), which route will lead to a cash dispenser machine with a large enough amount of available funds to withdraw cash, or which route is the best based on all three factors. In various arrangements, the determined route can be calculated based on a preference given by the customer 107. For example, the customer 107, in making the cash delivery request, can specify whether the customer 107 prefers a lower bill for the cash delivery or prefer the cash delivery occurs more quickly. In some arrangements, the quickest determined route can also be the route to the cash dispenser machine with the lowest amount of aggregate fees. Cash request processing circuit 118 can calculate the route for the driver 105 using data acquired from the location position sensor 170 of the customer user device 108, from the location position sensor 156 of the driver user device 106, and from the cash dispensers' information circuit 122 for the location of various cash dispensers.

At 210, the cash dispensers' information circuit 122 can be configured to send instructions to the cash dispenser machine to dispense cash in response to authenticating the driver user device 106. In some arrangements, the driver 105 can be verified at the cash dispenser machine by scanning a user interface of the driver user device 106, where the user interface is displaying or transmitting the CAC received at 206. In various arrangements, the CAC is displayed on the driver user device 106, such as in user interface 550 described in greater detail with reference to FIG. 5. IO circuit 134 and CAC processing circuit 136 of ATM 104 can be configured to determine the identification of the driver 105 attempting to pick up a cash delivery request for the customer 107. In some examples, when a communication signal is received by the provider computing system 102 that the first CAC was authenticated at the cash dispenser machine, the first CAC then expires. After or in response to the first CAC expiring, a second CAC may be generated by the CAC circuit 124 for verification by the customer user device 108. The instructions received at network interface circuit 126 at 210 can be configured to instruct cash dispenser 140 to withdraw the correct amount from the specified account of the customer 107 and dispense the cash to the driver 105. Additionally, printer and packer 144 can be instructed at 310 to print an envelope with a CAC, such as a barcode, pack the withdrawn cash in the envelope, and seal the envelope before dispensing the cash to the driver 105. In some arrangements, after the cash is dispensed to the driver 105, a notification may be sent to the customer user device 108 with an updated estimated time of arrival of the driver 105. In other arrangements, an updated, estimated time of arrival of the driver 105 at the final location of the customer user device 108 is sent to the customer user device 108 in response to an indication that the GPS location of the driver user device 106 is within a predetermined distance of the selected cash dispenser machine (e.g., the ATM 104).

Figure 3:
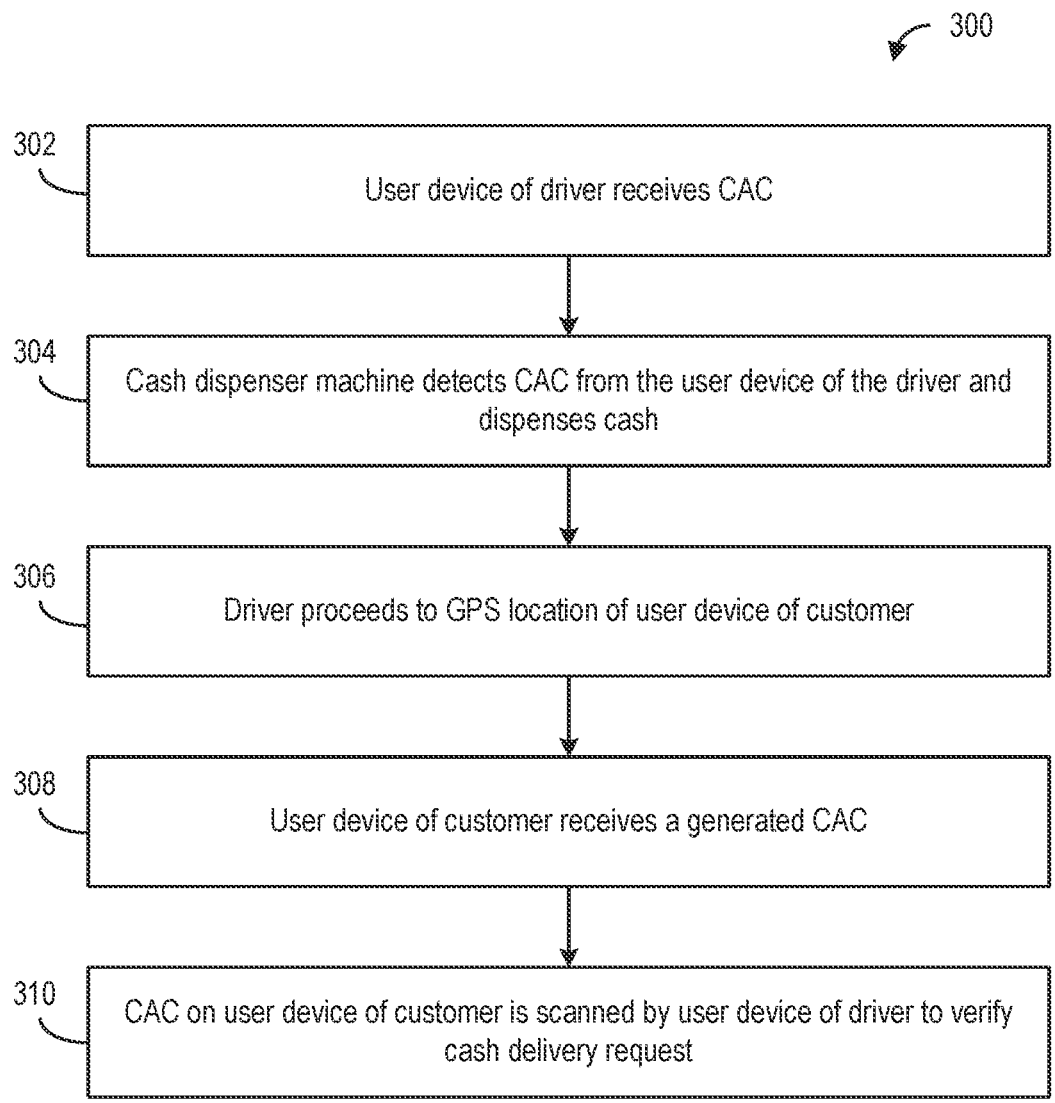
FIG. 3 is a flow diagram according to an example arrangement of a method for delivering cash from a cash dispenser machine to a customer, according to various arrangements.

Referring now to FIG. 3, a flow diagram illustrating a process 300 for delivering the cash to the customer 107 after the cash has been retrieved by the driver 105 is shown, according to various arrangements. Referring to FIGS. 1A-3, at 302, process 300 begins and the network interface circuit 146 of the driver user device 106 is configured to receive the CAC. The CAC can then be accessed via the cash delivery application. In some arrangements, when the CAC is received by the driver user device 106, the CAC is in the background of the cash delivery application and not shown to the driver 105. In other arrangements, the CAC may consist of one or more CACs. For example, a first CAC may include a CAC that the cash dispenser machine can detect through NFC signals. Then, in response to the cash dispenser machine detecting the first CAC (e.g., when a unique proximity signal is received from the driver user device 106 from the NFC transceiver of the network interface circuit 146 of the driver user device 106 and received by the NFC transceiver of the network interface circuit 126 of the ATM 104), a second CAC may be sent to the driver user device 106, such as but not limited to, a QR code (that is also unique to the transaction) for the driver 105 to scan at the cash dispenser machine (e.g., the ATM 104).

At 304, the CAC processing circuit 136 is configured to detect the CAC from the driver user device 106 and the cash dispenser machine dispenses the cash from the associated cash delivery request. In some examples, the IO circuit 134 may be configured to use a camera, such as camera 142, to scan the face of the delivery person (e.g., the driver 105) or another biometric response in addition to detecting the CAC. In some arrangements, the CAC is displayed on the driver user device 106 and then scanned by the cash dispenser machine (e.g., the ATM 104). However, in other arrangements, the CAC is in the background of the cash delivery application and not displayed to the driver 105. In this regard, the cash dispenser machine may detect the CAC through a communication network (e.g., a NFC network). For example, the NFC transceiver of network interface circuit 146 of the driver user device 106 may receive a NFC signal, generated uniquely for the cash delivery request, from the network interface circuit 110 of the provider computing system 102. Then, the driver user device 106 may broadcast the received NFC signal to the ATM 104 via the NFC transceiver of the network interface circuit 146. In some examples, the driver user device 106 may broadcast the received NFC signal in response to the driver user device 106 (e.g., the cash delivery application circuit 154) determining that a location of the driver user device 106 (as determined by the location position sensor 156) is within a predetermined distance (e.g., 10 feet, 5 feet, and so on) of the location of the ATM 104. The driver user device 106 receives the location of the ATM 104 is received from the provider computing system 102. The ATM 104 may detect the NFC signal from the driver user device 106 via a NFC transceiver of the network interface circuit 126 of ATM 104. In response to detecting the NFC signal, the ATM 104 sends the received NFC signal via the network 172 to the provider computing system 102, such that the provider computing system 102 can determine whether the received NFC signal matches the NFC signal sent to the driver user device 106 to complete the authentication. At 306, the driver proceeds to the GPS location of the customer user device. The driver 105 may view current progress towards the customer 107 via user interface 600 (FIG. 6A).

At 308, network interface circuit 160 of the customer user device 108 is configured to receive a generated CAC. CAC circuit 124 may be configured to generate and transmit via network 172 the same or similar CAC to the CAC generated at step 204 of process 200, sent to the driver user device 106. In some arrangements, the CAC may be the same type of code generated in process 200 at 204, or the CAC sent to the customer user device 108 may be a different type of CAC generated than at 204. For example, the CAC used by the driver 105 to retrieve the cash from the ATM 104 may be a virtual card issued to the driver 105, whereas the CAC sent to the customer 107 may be a QR code. In some examples, CAC circuit 124 may be configured to determine when the location data from the location position sensor 156 is within a predetermined distance of the location of the customer 107 based on the location data from the location position sensor 170, and then once within the predetermine distance, the generated CAC may be received at the customer user device 108 via network 172. In various examples, however, the customer user device 108 may not receive a generated scheme, and instead the verification between the driver 105 and the customer 107 occurs using a CAC on the driver user device 106 (e.g., a new CAC or the CAC used in process 200 for the interaction between the cash dispenser machine and the driver).

At 310, cash delivery application circuit 154 of the driver user device is configured to scan the CAC on the customer user device 108 to verify the cash delivery request. For example, a camera of the driver user device 106 may scan a one-time access code displayed on the screen of the customer user device 108. In other arrangements, the CAC may be entered via the driver user device 106 (e.g., a keyboard on a touch screen for a smartphone) instead of scanned (e.g., when the customer user device 108 receives an alphanumeric code or PIN for the CAC). In cases where the CAC is in the background of the cash delivery application, the driver 105 may not scan or enter any CAC, but instead the transaction may be authenticated over the network 172 via NFC once the driver user device 106 is within a predetermined distance of the customer user device 108. For example, the NFC signal may be transmitted over a unique frequency assigned for the specific cash delivery request or may contain a PIN or other in the data being sent from the NFC transceiver of the driver user device 106. In some arrangements, the tracking of the locations of the driver user device 106 and the customer user device 108 further authenticates the cash delivery request when the provider computing system 102 determines that the driver user device 106 is within a predetermined distance of the customer user device 108. In some arrangements, if the GPS location of the driver user device 106 deviates a predetermined distance from the calculated delivery route, the provider computing system 102 may cancel the cash delivery request and/or any transmitted CACs may expire to prevent the CAC being used for fraudulent purposes.

Referring now to FIG. 4, an example user interface 400 of a user device (e.g., customer user device 108) presenting the option to make a cash delivery request is shown, according to various arrangements. The example user interface 400 is an example of an interface generated when the customer 107 chooses a selectable option on a mobile application (e.g., an online banking application) to request cash to be delivered. For example, an online banking application has options for users to select "make a payment," "deposit a check," "view account balance," and "request cash delivery." In various arrangements, the example user interface 400 is generated via the cash delivery application circuit 168. Customer user device 108 includes a viewing area 402, where the customer 107 can select various options regarding the request for cash, input the amount they want to withdraw in cash, and input which account they want the cash withdrawn from for completing the cash delivery request. Cash withdraw directions 404 is presented to the customer 107 in viewing area 402 of the customer user device 108's display screen. The user interface 400 provides an "amount to withdraw" input box 406, where customer 107 can input the amount of cash they would like to have delivered to them. In some arrangements, the customer 107 can type in the amount of cash they want to request, or the customer 107 can choose from a selection of amount options (e.g., $20, $50, $100, $200). The user interface 400 can also provide an "account to withdraw from" input box 408. The customer 107 may select from customer 107's accounts linked to the provider institution (e.g., checking and savings accounts for an online banking application). In some arrangements, "account to withdraw from" input box 408 has a drop down tab that displays each available account the customer can choose from for the cash delivery request. In other arrangements, the customer 107 can enter a new bank account number or add a new account to save to the cash delivery application. The user interface 400 shows an "enter bill preference" selection option 410, a "send cash delivery request" selection option 412, and a "view nearby driver profiles and ratings" selection option 414.

Upon selection of the "enter bill preference" selection option 410, the customer 107 can be directed to enter how they want the cash to be withdrawn for the cash delivery request. For example, a pop up window is generated with the option to choose between $1, $5, 10, $20, $50, and $100 dollar bills, allowing the customer 107 to increase the amount for a specific one or more bills until the designated amount in the request is reached. Upon selection of "send cash delivery request" selection option 412, the customer 107 completes the request for cash delivery. After the customer 107 selects "send cash delivery request" selection option 412, the request can be communicated to a network of nearby drivers via network 172. In some arrangements, provider computing system 102 stores a list of driver accounts, cleared by the provider institution for delivering cash to the customers of the provider institution. In some examples, the cash delivery request is only sent to user devices of drivers who have an average rating above a predetermined amount based on the amount of cash to withdraw. For example, if the amount to withdraw is above a certain threshold, the delivery request is only transmitted to a driver user device 106 for a driver who has a 5-star rating for the profile associated with the driver.

Further, upon selection of the "view nearby driver profiles and ratings" selection option 414, the customer 107 can be directed to an interface for reading reviews, ratings, and viewing other aspects of driver profiles for driver user devices located within a predetermined distance of the customer user device 108. In some arrangements, if the driver user device 106 is within a certain distance (e.g., within 10 miles) of the customer user device 108, the profile of the driver is displayed when the customer 107 selects "view nearby driver profiles and ratings" selection option 414. In other arrangements, viewing area 402 includes other options the customer 107 can select, such as options for splitting the cash delivery request between more than one bank account, sending the cash delivery request to a GPS location of a friend's user device instead of the current GPS location of the customer user device 108, entering a preferred delivery time, or entering other delivery information that can be helpful to the driver making the cash delivery.

Referring now to FIGS. 5A and 5B, an example user interface 500 for driver user device 106 is shown, according to various arrangements. Viewing area 502 can display a cash delivery request that the driver 105 receives via network 172 on driver user device 106 and can display various options to the driver 105 regarding the cash delivery request. "Estimated trip time" text 504 can display the anticipated amount of time it will take the driver 105 to take a route from the current GPS location of driver user device 106 to the location of a selected cash dispenser machine (e.g., ATM 104 or a different cash dispenser machine with the lowest amount of aggregate fees for withdrawing cash) to the GPS location of customer user device 108 to deliver the cash to the customer 107. "End destination" text 506 can display a general determined location (e.g., City Mall) of the customer user device 108 that made the cash delivery request, or a specific address. The user interface 500 shows a "view calculated delivery route" selection option 508, a "view user 149 profile" selection option 510, a "view your current driver profile" selection option 512, and an 'accept delivery request" selection option 514.

Upon selection of "view calculated delivery route" selection option 508, a user interface (such as user interface 600 described in greater detail below) depicting an interactive map of the area in proximity to driver user device 106 and the calculated route can be displayed in viewing area 502. The calculated route may show how the driver 105 can go from the current position of the driver user device 106, to the selected cash dispenser machine, to the third and final location of the customer user device 108. In some examples, the calculated delivery route is determined on the shortest amount of distance between the current GPS location of driver user device 106, the location of the cash dispenser (i.e., from a GPS location of an ATM, a Wi-Fi signal from a POS register, etc.), and the GPS location of customer user device 108. In other examples, the calculated delivery route is determined based on the lowest amount of time to get from the "START," to "STOP," to "END" as described with reference to FIG. 1A. For example, the route may be calculated using updated, real-time traffic information in order to deliver the cash to the customer 107 as quick as possible. In some examples, the calculated delivery route is determined based on which cash dispenser machines have the capability of dispensing the amount specified by the customer 107 in the cash delivery request and also have the lowest fees charged for withdrawing cash.

Upon selection of "view user 149 profile," selection option 510, the driver 105 can be directed to an interface displaying the profile of the customer 107 who made the cash delivery request. For example, cash request processing circuit 118 can be configured to combine data on customer 107's previous cash delivery requests with data extracted from the customer account database 120 for a user profile to display to drivers using the cash delivery application. The customer profile can include information regarding the customer 107, such as the customer 107's name, picture, and contact information in case the driver is unable to find the customer 107 when the GPS location of the customer user device 108 is reached. The user profile can also include reviews and ratings for the customer 107 given by previous drivers who have delivered cash to customer 107. A new driver may then use that information to decide whether they want to accept a cash delivery request made by customer 107 based on if experiences interacting with the customer 107 were positive or negative.

Upon selection of "view your current driver profile" selection option 512, the driver 105 can be directed to an interface displaying the current profile of the driver 105. In some examples, the driver profile displays the reviews previous users have made on the customer experience from the driver, past delivery trips, saved information on the previous delivery trips, and ratings of the driver (e.g., an overall average rating of the driver or each rating a customer has left). The current driver profile can also display contact information for the driver 105, a photo of the driver 105, and type of vehicle the driver 105 operates and presents options to the driver 105 to edit or update the current user information. In some examples, the driver profile links social media activity to the driver 105's account (e.g., tweets tagging the driver 105 from customers who had positive experiences are linked to the driver's profile).

Upon selection of "accept delivery request" selection option 514, a message indicating the driver 105 has confirmed the cash delivery request can be sent to the customer user device 108 and the driver 105 can be directed to user interface 550, as described with greater detail below. In some examples, after the driver 105 chooses the "accept delivery request" selection option 514, other user devices in the network of devices who were also notified of the cash delivery request can receive an indication that the cash delivery request has been taken and the need for a driver to accept the task no longer exists. The customer 107 who made the cash delivery request can be directed to user interface 650 after the driver 105 selects "accept delivery request" selection option 514 on the driver user device 106.

Referring now to FIG. 5B specifically, an example user interface 550 for the driver 105 to use in authenticating the cash delivery request is depicted, according to some arrangements. In various examples, user interface 550 is displayed on driver user device 106 once the driver 105 indicates acceptance of a cash delivery request. The driver user device 106 includes a viewing area 552, where the driver 105 can view instructions such as "Scan code at ATM to authorize cash request pick-up," the CAC for the cash delivery request (e.g., QR code 556, and user interface 550 selection options (e.g., "view delivery route information" selection option 558). In various arrangements, a new "Time to Customer" text 554 is displayed to the driver 105 via user interface 550. In other examples, "Estimated Trip Time" text 504 is also displayed in user interface 550 such that the driver 105 can determine if they are on track to deliver the cash in the estimated total time or if they are running late for the delivery. In some arrangements, other selection options are available, such as options to request a new CAC, contact the customer 107 who made the cash delivery request, or cancel the trip if the driver 105 runs into a problem while making the trip (e.g., a roadblock, a flat tire, etc.). Upon selection of "view delivery route information" selection option 558, the driver 105 can be directed to a user interface similar to user interface 600 on driver user device 106. The delivery route information can include a map of the overall route and an indication of the driver 105's progress on the route to the customer 107. The delivery route information can also include the address of the "STOP" location of the cash dispenser machine (e.g., the location of the ATM 104) and of the "END" destination. The "END" destination can be displayed with an indication on the map of where the customer user device 108 is currently located determined from GPS data provided by customer user device 108. In some examples, when a map is displayed after the "view delivery route information" selection option 558 is chosen by the driver 105, the driver 105 can see traffic incidents and reports that may slow down progress on the calculated delivery route.

Referring to FIGS. 6A and 6B, user interfaces for the driver user device 106 and the customer user device 108 are shown, respectively, according to some arrangements. Example user interface 600 for the driver user device 106 can be displayed to the driver 105 and example user interface 650 for customer user device 108 can be displayed to the customer 107 while the cash delivery is in progress (e.g., the driver 105 has begun the delivery route but has not yet reached the "END" destination to deliver the cash to the customer 107).

User interface 600 can be displayed to the driver 105 upon selection of "view calculated delivery route" selection option 508, described with reference to FIG. 5A. User interface 600 can include viewing area 602, which can display map 612, "Estimated Trip Time" text 604, "Current Speed Limit" information 614, and "Next Turn" information 616. In some examples, "Next Turn" information 616 is a selectable/activatable link the driver 105 can select via the display screen of driver user device 106 to view more details on the upcoming turn and the following turns to reach the GPS location of customer user device 108. Map 612 can be displayed to the driver 105 to show an overview of the delivery route, or may be zoomed in on the current location of the driver user device 106 with respect to the route to show in real-time how soon the driver 105 turns or current traffic incidents. Map 612 can show the first location of the driver user device 106 when the driver 105 accepts the cash delivery request as the "Start" location 606 of the delivery route, the "Stop" location 608 as the location of the cash dispenser machine where the driver 105 will retrieve the cash, and the "End" location 610 as the location of customer user device 108 where the driver 105 will meet the customer 107 and authenticate the exchange of the cash to the customer 107.

FIG. 6B depicts an example user interface 650 for displaying via customer user device 108 the progress of the driver 105 on the route to deliver the cash to the customer 107, according to various arrangements. User interface 650 can include viewing area 652, "Estimated Arrival" information 654, map 658, and cash delivery selection options 660-664. Map 658 can be similar or identical to 616 with reference to user interface 600, with the same "Start," "Stop," and "End" locations displayed as those shown in user interface 600 via driver user device 106. The driver's current location 658 can be shown on map 658 by tracking the current GPS location of the driver user device 106. User interface 650 shows a "provide specific delivery instructions" selection option 660, a "call driver" selection option 662, and a "cancel cash request" selection option 664. Upon the selection of "provide specific delivery instructions" selection option 660, a text window can be generated and displayed via customer user device 108. The customer 107 can enter more delivery information to send to the driver user device 106, such as "meet me at terminal 4 of the airport" or "please call me once you are at the parking lot of the mall," etc. Further, upon selection of "call driver" selection option 662, an interface for placing a phone call can be generated and displayed to the customer 107, with the contact information of the driver 105 automatically entered to dial the driver user device 106. Upon selection of "cancel cash request" selection 664, the customer 107 can end the cash delivery request and a message can be automatically transmitted to the driver user device 106 indicating the cash delivery request has been canceled. In some examples, when "cancel cash request" selection option 664 is chosen, the user interface 650 exits and returns to the home page of the cash delivery application on the customer user device 108.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on).

The "circuit" may also include one or more dedicated processors communicatively coupled to one or more dedicated memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, et.), microprocessor, etc.

An example system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method comprising:
    transmitting, by a provider computing system based on a cash delivery request, a first cash authentication code (CAC) to a first user device of a deliverer;
    in response to determining that the first CAC was verified at a cash dispenser machine, transmitting, by the provider computing system, a second CAC to the first user device;
    determining, by the provider computing system, a route from a current global positioning system (GPS) location of the first user device, to a GPS location of the cash dispenser machine, and to a GPS location of a second user device of a customer; and
    sending, by the provider computing system, instructions to the cash dispenser machine to dispense an amount of cash associated with the cash delivery request in response to determining that the cash dispenser machine verified the second CAC from the first user device and determining that the current GPS location of the first user device is within a predetermined distance of the GPS location of the cash dispenser machine.

2. The method of claim 1, wherein the first CAC comprises at least one of a quick response (QR) code, a near field communication (NFC) signal, or a virtual card received via an online mobile application.

3. The method of claim 1, wherein the second CAC comprises at least one of a quick response (QR) code, a near field communication (NFC) signal, or a virtual card received via an online mobile application.

4. The method of claim 1, wherein the cash dispenser machine comprises an Automated Teller Machines (ATMs) or a cash locker.

5. The method of claim 1, further comprising expiring, by the provider computing system, the first CAC in response to the first CAC being verified at the cash dispenser machine.

6. The method of claim 1, further comprising cancelling, by the provider computing system, the cash delivery request based on the current GPS location of the first user device.

7. A system, comprising:
at least one processor operatively coupled to a memory to form a processing circuit, the at least one processor configured to:
transmit, based on a cash delivery request, a first cash authentication code (CAC) to a first user device of a deliverer;
in response to determining that the first CAC was verified at a cash dispenser machine, transmit a second CAC to the first user device;
determine a route from a current global positioning system (GPS) location of the first user device, to a GPS location of the cash dispenser machine, and to a GPS location of a second user device of a customer; and
send instructions to the cash dispenser machine to dispense an amount of cash associated with the cash delivery request in response to determining that the cash dispenser machine verified the second CAC from the first user device and determining that the current GPS location of the first user device is within a predetermined distance of the GPS location of the cash dispenser machine.

8. The system of claim 7, wherein the first CAC comprises at least one of a quick response (QR) code, a near field communication (NFC) signal, or a virtual card received via an online mobile application.

9. The system of claim 7, wherein the second CAC comprises at least one of a quick response (QR) code, a near field communication (NFC) signal, or a virtual card received via an online mobile application.

10. The system of claim 7, wherein the cash dispenser machine comprises an Automated Teller Machines (ATMs) or a cash locker.

11. The system of claim 7, wherein the processing circuit is further configured to expire the first CAC in response to the first CAC being verified at the cash dispenser machine.

12. The system of claim 7, wherein the processing circuit is further configured to cancel the cash delivery request based on the current GPS location of the first user device.

13. A non-transitory computer-readable medium comprising computer-readable instructions such that, when executed by at least one processor, causes the at least one processor to:
transmit, based on a cash delivery request, a first cash authentication code (CAC) to a first user device of a deliverer;
in response to determining that the first CAC was verified at a cash dispenser machine, transmit a second CAC to the first user device;
determine a route from a current global positioning system (GPS) location of the first user device, to a GPS location of the cash dispenser machine, and to a GPS location of a second user device of a customer; and
send instructions to the cash dispenser machine to dispense an amount of cash associated with the cash delivery request in response to determining that the cash dispenser machine verified the second CAC from the first user device and determining that the current GPS location of the first user device is within a predetermined distance of the GPS location of the cash dispenser machine.

14. The non-transitory computer-readable medium of claim 13, wherein the first CAC comprises at least one of a quick response (QR) code, a near field communication (NFC) signal, or a virtual card received via an online mobile application.

15. The non-transitory computer-readable medium of claim 13, wherein the second CAC comprises at least one of a quick response (QR) code, a near field communication (NFC) signal, or a virtual card received via an online mobile application.

16. The non-transitory computer-readable medium of claim 13, wherein the computer-readable instructions further cause the at least one processor to expire the first CAC in response to the first CAC being verified at the cash dispenser machine.

17. The non-transitory computer-readable medium of claim 13, wherein the computer-readable instructions further cause the at least one processor to cancel the cash delivery request based on the current GPS location of the first user device.

* * * * *